US012040567B2

(12) United States Patent
Burris et al.

(10) Patent No.: US 12,040,567 B2
(45) Date of Patent: Jul. 16, 2024

(54) COAXIAL RIGHT-ANGLE PCB TO CABLE

(71) Applicant: Corning Optical Communications RF LLC, Glendale, AZ (US)

(72) Inventors: Donald Andrew Burris, Peoria, AZ (US); Thomas Edmond Flaherty, IV, Surprise, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 470 days.

(21) Appl. No.: 17/324,083

(22) Filed: May 18, 2021

(65) Prior Publication Data

US 2022/0368043 A1 Nov. 17, 2022

Related U.S. Application Data

(63) Continuation of application No. PCT/US2019/061926, filed on Nov. 18, 2019.

(60) Provisional application No. 62/769,804, filed on Nov. 20, 2018.

(51) Int. Cl.

*H01R 12/53* (2011.01)
*H01R 9/05* (2006.01)
*H01R 12/58* (2011.01)

(52) U.S. Cl.

CPC ........... *H01R 12/53* (2013.01); *H01R 9/0506* (2013.01); *H01R 12/58* (2013.01)

(58) Field of Classification Search

CPC ...... H01R 12/53; H01R 9/0506; H01R 12/58; H01R 12/515; H01R 13/025; H01R 13/506; H01R 43/205; H01R 2103/00; H01R 9/0515; H01R 24/40

See application file for complete search history.

(56) References Cited

U.S. PATENT DOCUMENTS 5,842,872 A 12/1998 Hosler et al.
6,335,487 B1 1/2002 Ullrich
6,817,899 B1 * 11/2004 Zerebilov ............ H01R 9/0524 439/585

(Continued)

FOREIGN PATENT DOCUMENTS

DE 2510170 A1 9/1976
DE 19902428 C1 7/2000

(Continued)

OTHER PUBLICATIONS

International Search Report and Written Opinion of the International Searching Authority; PCT/US19/61926; dated Mar. 10, 2020; 8 Pages; Korean Intellectual Property Office.

(Continued)

*Primary Examiner* — Michael C Zarroli
(74) *Attorney, Agent, or Firm* — Tamika A. Crawl-Bey

(57) ABSTRACT

A connector assembly includes housing for storing components of the connector assembly. The connector assembly further includes a cable including a cable center conductor, wherein the cable center conductor is configured as a signal conductor. The connector assembly also includes a first dielectric and an alignment dielectric. Each of the first dielectric and the alignment dielectric includes a path to guide the cable center conductor through an angle to a printed circuit board as the cable is axially inserted into the housing.

20 Claims, 17 Drawing Sheets

(56) References Cited

U.S. PATENT DOCUMENTS

| | | | | |
|---|---|---|---|---|
| 7,269,896 | B2 | 9/2007 | Edwardsen et al. | |
| 8,047,872 | B2 | 11/2011 | Burris et al. | |
| 2004/0102094 | A1 | 5/2004 | Hall et al. | |
| 2004/0203283 | A1 | 10/2004 | Chen et al. | |
| 2005/0059275 | A1 | 3/2005 | Swantner et al. | |
| 2006/0113101 | A1 | 6/2006 | Wild et al. | |
| 2007/0111596 | A1* | 5/2007 | Weidner ............... | H01R 9/0515 439/581 |
| 2008/0293298 | A1* | 11/2008 | Burris .................. | H01R 13/622 439/582 |
| 2011/0021070 | A1 | 1/2011 | Burris et al. | |
| 2017/0365963 | A1 | 12/2017 | Watanabe et al. | |

FOREIGN PATENT DOCUMENTS

| | | | |
|---|---|---|---|
| DE | 20316649 | U1 | 12/2003 |
| JP | 2008-192474 | A | 8/2008 |

OTHER PUBLICATIONS

European Patent Application No. 19887624.5, European Search Report, dated Jul. 1, 2022; 09 pages; European Patent Office.

Taiwanese Patent Application No. 108141893, Office Action, dated Aug. 17, 2023, 1 page; Taiwanese Patent Office.

* cited by examiner

700

COAXIAL RIGHT-ANGLE PCB TO CABLE

CROSS-REFERENCE TO RELATED APPLICATIONS

This application is a continuation of International Application No. PCT/US2019/061926, filed Nov. 18, 2019, which claims the benefit of priority to U.S. Provisional Application Ser. No. 62/769,804, filed Nov. 20, 2018, the content of both applications are relied upon and incorporated herein by reference in their entirety.

BACKGROUND

The present disclosure generally relates to coaxial connectors and connector assemblies.

Some microwave frequency connectors have right angle housings and metallic center contacts that are designed to be soldered directly to a printed circuit board (PCB). The metallic center contacts are generally surrounded by a plastic insulator and a metallic housing. Socket contacts in these connector assemblies are a key component in the transmission of electrical signal. The components in these connectors may be coupled by various methods, including a push-on design. These types of connectors may use a cable interconnect to transmit the signal to the PCB. However, these types of interconnections usually perform poorly above 10 GHz due to a right-angle transition to the PCB.

There are also right-angle cable connectors that also include right angle housing and a metallic center contact that engages with a cable. The metallic center contact in the cable connector is also generally surrounded by a plastic insulator and a metallic housing. The connector components also may be coupled by various methods including a push-on design. The cable in the right-angle housing may be engaged, for example, by soldering a metallic access contact to a center conductor of the cable and then inserting the metallic access contact and cable subassembly into the right-angle housing. The metallic access center contact may thereafter be mated with a socket center contact within the right-angle housing. Another method to engage the cable is to simply insert the prepared cable into the right housing where the center conductor of the cable directly engages the socket center contact in the right housing. In both cases the cable may be soldered to the housing. These types of design perform well between 10 to 30 GHz, depending on the specification of the cable.

SUMMARY

Embodiments are directed to connector assemblies configured to operate at high frequencies, including frequencies up to 65 GHz, with low insertion and return losses. The connector assemblies may include a metallic housing, a first dielectric, and an alignment dielectric. The dielectrics are configured to guide a cable center conductor, functioning as a signal conductor, through an angle from 0° to 90° transition to a printed circuit board (PCB). The number of components in these connector assemblies makes the connector assemblies cost effective. The connector assemblies also have a very low a profile and may be used in compact PCB assemblies.

Some embodiments are directed to a connector assembly comprising housing for storing components of the connector assembly. The connector assembly further includes a cable including a cable center conductor, wherein the cable center conductor is configured as a signal conductor. The connector assembly also includes a first dielectric and an alignment dielectric, wherein each of the first dielectric and the alignment dielectric includes a path to guide the cable center conductor through an angle to a printed circuit board, as the cable is axially inserted into the housing.

In some embodiments, the housing includes multiple ports for several signals. Accordingly, some embodiments are directed to a connector assembly comprising housing including multiple ports, wherein the housing is configured to store components of the connector assembly. The connector assembly also includes a cable including a cable center conductor, wherein the cable center conductor is configured as a signal conductor. The connector assembly further includes a first dielectric and an alignment dielectric, wherein each of the first dielectric and the alignment dielectric includes a path to guide the cable center conductor through an angle to a printed circuit board, as the cable is axially inserted into the housing.

Some embodiment are also directed to a method including inserting a cable forward into a housing of a connector assembly; looping an alignment tool around a cable center conductor of the cable; pushing the cable into the housing until the cable center conductor bottoms in the housing; pulling the cable center conductor downward in a path in the housing, bending at an intersection of a dielectric stop as the cable is continually inserted into the housing; and bending the cable center conductor to a ninety degree orientation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5A-2 is a sectional view of halves of the dielectric in accordance with some embodiments.

FIG. 5B-1 is a front view of the dielectric halves in accordance with some embodiments.

FIG. 5B-2 is a bottom view of the dielectric halves in accordance with some embodiments.

FIG. 5C-1 is a sectional view illustrating the alignment features of the dielectric halves in accordance with some embodiments.

FIG. 5C-2 further illustrates the sectional view of FIG. 5C-1 in accordance with some embodiments.

FIG. 5D-1 is another dielectric used in accordance with some embodiments.

FIG. 5D-2 is a sectional view of halves of the dielectric of FIG. 5D-1 in accordance with some embodiments.

FIG. 5E-1 is a front view of the dielectric halves of FIG. 5D-1 in accordance with some embodiments.

FIG. 5E-2 is a bottom view of the dielectric halves of FIG. 5D-1 in accordance with some embodiments.

FIG. 5F-1 is a sectional view illustrating the alignment features of the dielectric halves of FIG. 5D-1 in accordance with some embodiments.

FIG. 5F-2 further illustrates the sectional view of FIG. 5F-1 in accordance with some embodiments.

Figure 1A:
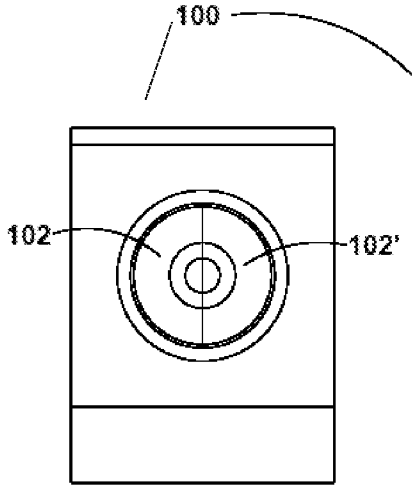
FIG. 1A is a front view a connector assembly used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to connector assemblies configured to operate at high frequencies, including frequencies up to 65 GHz, with low insertion and return losses. FIG. 1A shows a front view a connector assembly 100 used in accordance with some embodiments. Connector assembly 100 includes a first dielectric having halves 102 and 102', each of which are configured to guide a cable center conductor through an angle from 0° to 90° transition to a printed circuit board (PCB). The cable center conductor functions as the signal conductor.

Figure 1B:
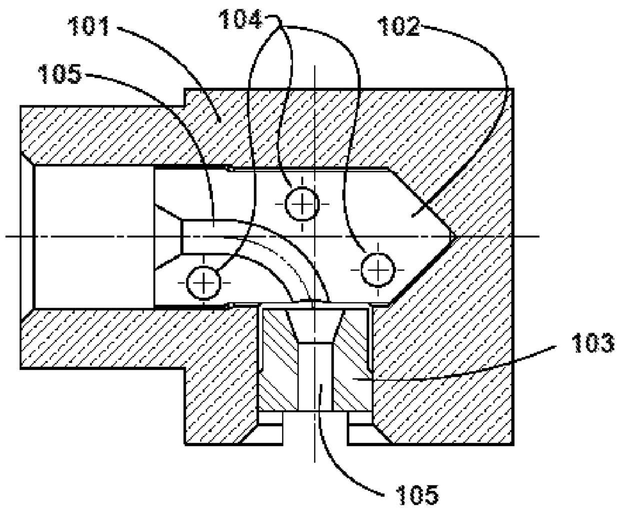
FIG. 1B is a sectional view of the connector assembly in accordance with some embodiments.

FIG. 1B shows a sectional view of connector assembly 100 in accordance with some embodiments. Connector assembly 100 includes a right angle metallic housing 101, one of the dielectric sections shown in FIG. 1A, in this case dielectric 102, an additional alignment dielectric 103, and one or more optional alignment members 104. Housing 101 is configured to store components of connector assembly 100. Each of dielectric halves 102 and 102' and alignment dielectric 103 is configured to guide a cable inserted into housing 101 into position. Alignment members 104 are configured to orient the halves of the first dielectric when the first dielectric is inserted into housing 101. FIG. 1B also illustrates a path 105, through the first dielectric and alignment dielectric 103, that a center conductor of the cable will follow upon insertion into housing 101.

Figure 2A:
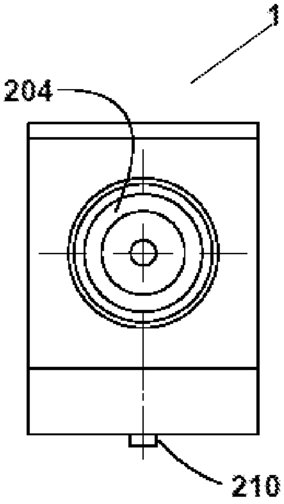
FIG. 2A is another front view of the connector assembly in accordance with some embodiments.

FIG. 2A shows another front view of connector assembly 100 in accordance with some embodiments. FIG. 2A shows that a cable 204 and a cable center conductor 210 are inserted into the housing.

Figure 2B:
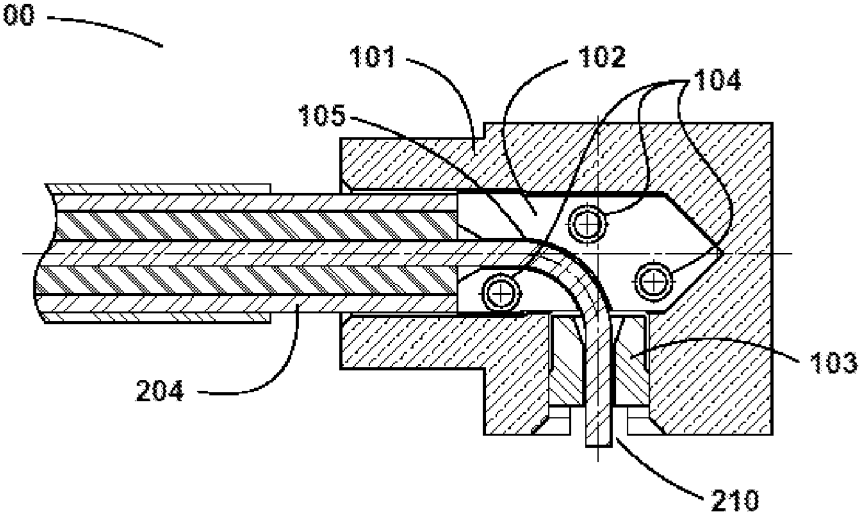
FIG. 2B is a sectional view of the connector assembly of FIG. 2A in accordance with some embodiments.

FIG. 2B shows a sectional view of connector assembly 100 of FIG. 2A in accordance with some embodiments. In FIG. 2B, cable center conductor 210 may follow path 105 as cable 204 is inserted into housing 101. Cable center conductor 210 is configured with compliant properties that allow it to readily follow path 105 when cable 204 is axially advanced into housing 101.

Figure 2C:
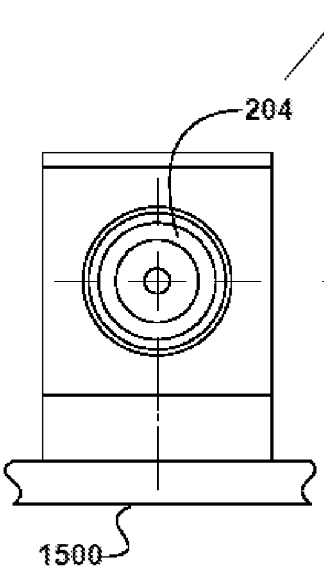
FIG. 2C is a further front view of the connector assembly in accordance with some embodiments.

FIG. 2C shows a further front view of connector assembly 100 in accordance with some embodiments. In FIG. 2C, cable 204 is mounted to a PCB 1500.

Figure 2D:
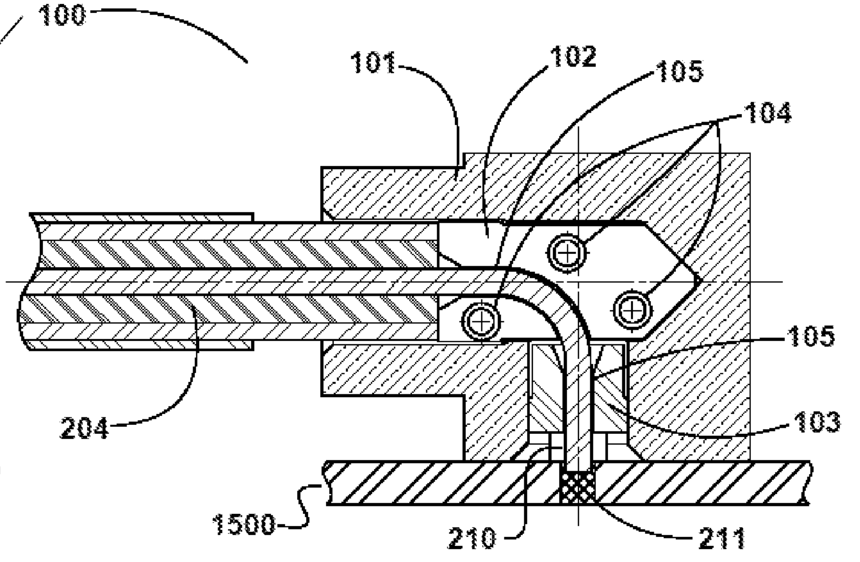
FIG. 2D is a sectional view of the connector assembly of FIG. 2C in accordance with some embodiments.

FIG. 2D shows a sectional view of connector assembly 100 of FIG. 2C in accordance with some embodiments. Connection member 211, for example, solder may be used to connect cable center conductor 210 to PCB 1500.

Figure 3A:
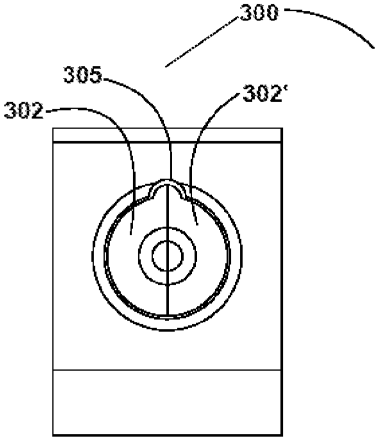
FIG. 3A is a front view of another connector assembly in accordance with some embodiments.

FIG. 3A shows a front view of another connector assembly in accordance with some embodiments. Connector assembly 300 includes a first dielectric including halves 302 and 302' and an orientation member 305. Dielectric halves 302 and 302' are configured to guide a cable center conductor through a housing of connector assembly 300 to the PCB. Orientation member 305 is configured to ensure the orientation of dielectrics sections 302 and 302' when the first dielectric is inserted into the housing.

Figure 3B:
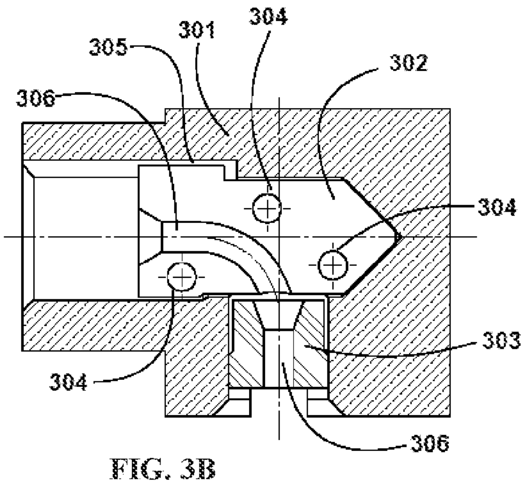
FIG. 3B is a sectional view of the connector assembly of FIG. 3A in accordance with some embodiments.

FIG. 3B shows a sectional view of connector assembly 300 in accordance with some embodiments. Connector assembly 300 includes a right angle metallic housing 301, a section of the first dielectric (in this case dielectric half 302), an alignment dielectric 303, and multiple optional alignment members 304. Dielectric section 302 is configured to guide a cable inserted into housing 301 into position. Orientation member 305 is configured to ensure that dielectric half 302 is properly oriented when inserted into the housing 301. Alignment members 304 are also configured to ensure that a cable path 306 in dielectric section 302 remains in the proper orientation. In some embodiments, alignment members 304 are configured to maintain proper alignment of dielectric section 302 with path 306 in the alignment dielectric 303. Orientation member 305 is also further configured to ensure that dielectric sections 302 and 302' maintain the proper orientation to path 306 in the alignment dielectric 303. A cable center conductor follows path 306 upon insertion into housing 301.

Figure 4A:
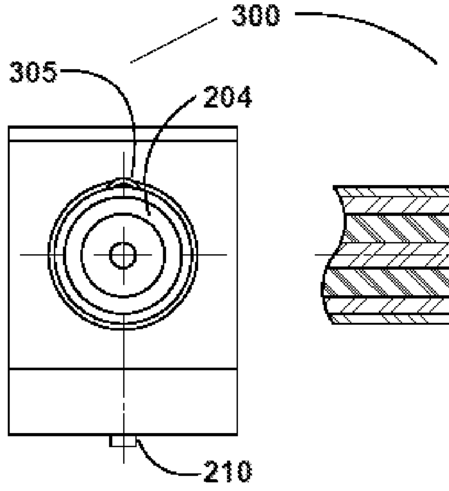
FIG. 4A is another front view of the connector assembly of FIG. 3A in accordance with some embodiments.

FIG. 4A shows another front view of connector assembly 300 in accordance with some embodiments. FIG. 4A shows that a cable 204 and a cable center conductor 210 are inserted into the housing of connector assembly 300.

Figure 4B:
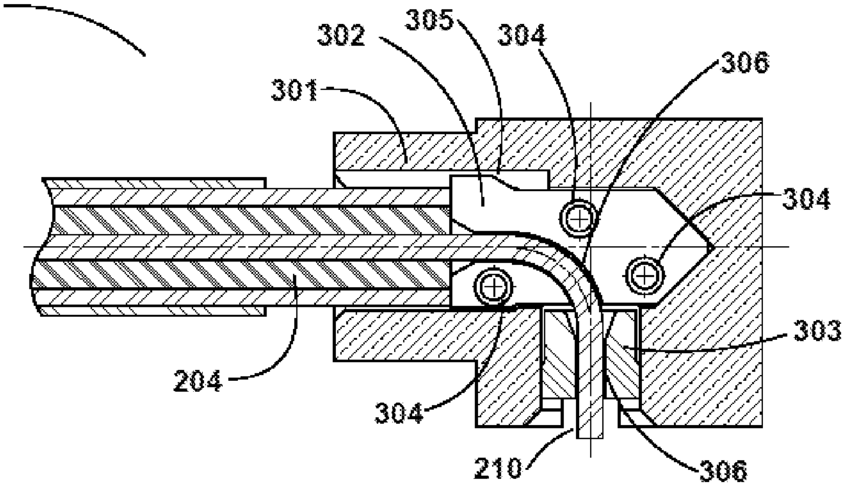
FIG. 4B is a sectional view of the connector assembly of FIG. 4A in accordance with some embodiments.

FIG. 4B shows a sectional view of connector assembly 300 of FIG. 4A in accordance with some embodiments. FIG. 4B shows the path 306 cable center conductor 210 will follow as cable 204 is inserted into housing, 301. Cable center conductor 210 is configured with compliant properties that allow it to readily follow path 306 when cable 204 is axially advanced into housing 301.

Figures 1, 5A:
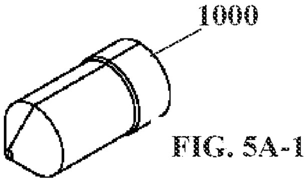
FIG. 5A-1 is a dielectric used in accordance with some embodiments.

FIG. 5A-1 shows a dielectric 1000 used in accordance with some embodiments.

Figures 2, 5A:
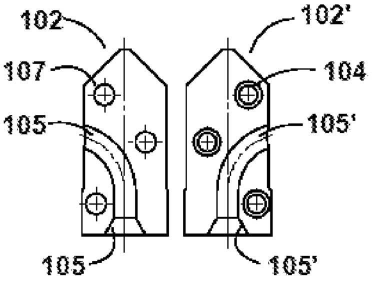

FIG. 5A-2 shows a sectional view of halves 102 and 102' of the dielectric 1000 used in accordance with some embodiments. Although the dielectrics sections 102 and 102' shown in FIG. 5A-2-5C-2 are referenced as dielectrics 102 and 102', the descriptions for FIG. 5A-2-5C-2 may be applicable to other dielectrics used in accordance with other embodiments.

Each of sections 102 and 102' of dielectric 1000 includes a center conductor path 105 and 105'. An alignment feature, such as a post 107 in a first dielectric section (for example, section 102) corresponds with an alignment feature, such as a socket 104 in a second dielectric section (for example, section 102') to align and retain dielectrics sections 102 and 102' when mated, for example, by means of a press-fit alignment.

Figures 1, 5B:
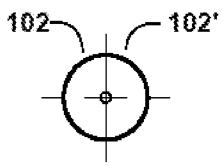
Figures 1, 5C:
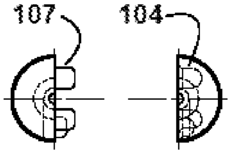
Figures 2, 5B:
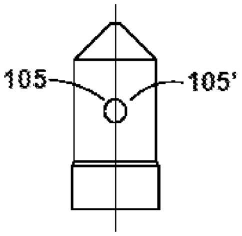
Figures 2, 5C:
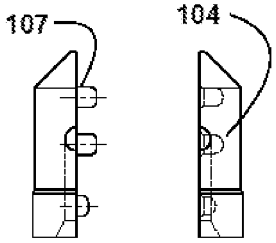

FIG. 5B-1 shows a front view of dielectric halves 102 and 102' in accordance with some embodiments.

FIG. 5B-2 shows a bottom view of dielectric halves 102 and 102' in accordance with some embodiments.

FIG. 5C-1 shows a sectional view illustrating the alignment features of dielectric halves 102 and 102' in accordance with some embodiments. The first dielectric section, for example, section 102, includes post 107 that is configured to mate with socket 104 in the second dielectric section, for example, section 102'. When mated, post 107 and socket 104 are configured to align the mated dielectrics section 102 and 102'.

FIG. 5C-2 further illustrates the sectional view of FIG. 5C-1 in accordance with some embodiments. Each of the dielectric sections are shown to include multiple alignment features, i.e., dielectric section 102 includes multiple posts 107 that are configured to mate with corresponding sockets 104 in dielectric section 102'.

Figures 1, 5D:
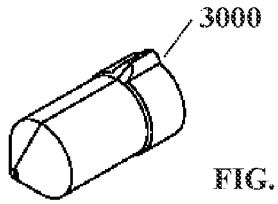

FIG. 5D-1 shows a dielectric 3000 used in accordance with some embodiments.

FIG. 5D-2 shows a sectional view of halves 302 and 302' of dielectric 3000 used in accordance with some embodiments. Although the dielectrics sections shown in FIGS. 5D-2 and 5F-2 are referenced as dielectrics 302 and 302', the descriptions for FIG. 5D-2-5F-2 may be applicable to other dielectrics used in accordance with other embodiments.

Each section 302 and 302' of dielectric 3000 includes a center conductor path 305 and 305'. A post 307 in dielectric section 302 corresponds with a socket 304 in dielectric section 302' to align and retain dielectric sections 302 and 302' when they are mated, for example, by means of a press-fit alignment. Dielectric section 302 includes an alignment mechanism 310 that corresponds with and alignment mechanism 311 of dielectric section 302'. Together alignment mechanism 310 and alignment mechanism 311 are configured to align sections 302 and 302' of dielectric 3000 in the metallic housing shown, for example, in FIG. 3B.

Figures 1, 5E:
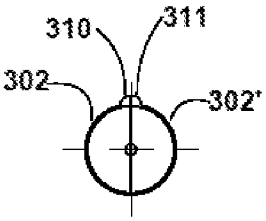
Figures 1, 5F:
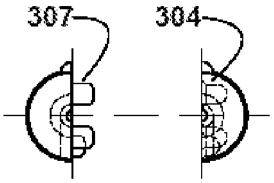
Figures 2, 5D:
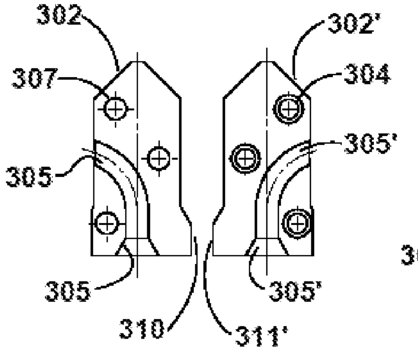
Figures 2, 5E:
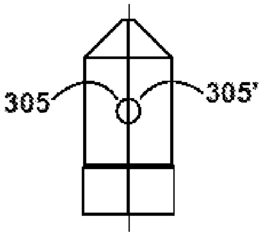
Figures 2, 5F:
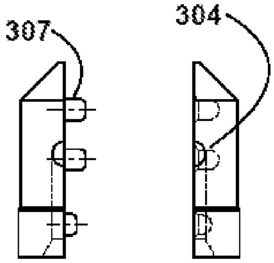

FIG. 5E-1 shows a front view of dielectric halves 302 and 302' in accordance with some embodiments.

FIG. 5E-2 shows a bottom view of dielectric halves 302 and 302' in accordance with some embodiments.

FIG. 5F-1 shows a sectional view illustrating the alignment features of dielectric halves 302 and 302' in accordance with some embodiments. Dielectric section 302 includes post 307 that is configured to mate with socket 304 in dielectric section 302'. When mated, post 307 and socket 304 are configured to align the mated dielectrics sections 302 and 302'.

FIG. 5F-2 further illustrates the sectional view of FIG. 5F-1 in accordance with some embodiments. Each of the dielectric sections are shown to include multiple alignment features, i.e., dielectric section 302 includes multiple posts 307 that are configured to mate with corresponding sockets 304 in dielectric section 302'.

Figure 6A:
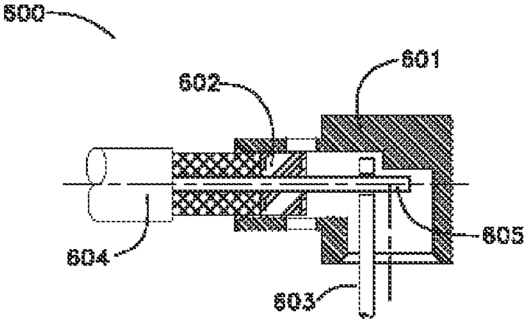
FIGS. 6A-6I show sectional views that demonstrate how a cable is installed in accordance with some embodiments.

FIGS. 6A-6I show sectional views that demonstrate how a cable is installed in accordance with some embodiments. FIG. 6A shows that cable 604 is inserted into metallic housing 601 and a dielectric stop 602 is inserted over the cable center conductor 605. Dielectric stop 602 is configured to help prevent the cable dielectric from extruding after heat is applied to solder cable 604 to metallic housing 601. An alignment tool 603 is configured to hook around cable center conductor 605 to guide cable center conductor 605 around a 90° section of metallic housing 601. FIG. 6A shows cable 604 inserted forward into housing 601 and alignment tool 603 being looped around cable center conductor 605.

Figure 6B:
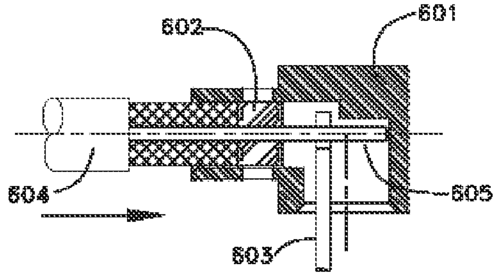
Figure 6C:
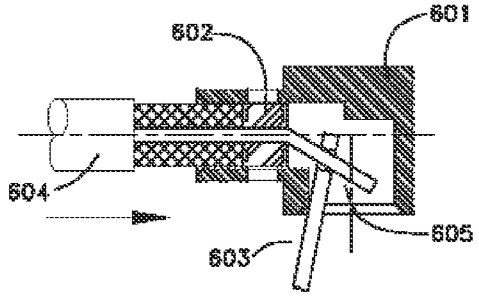
Figure 6D:
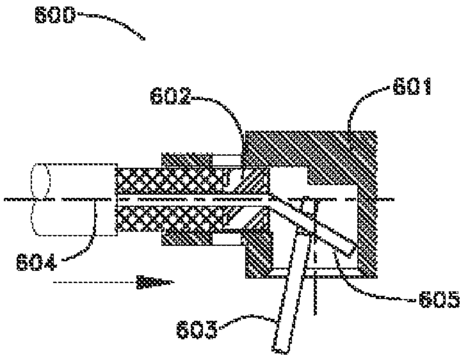
Figure 6E:
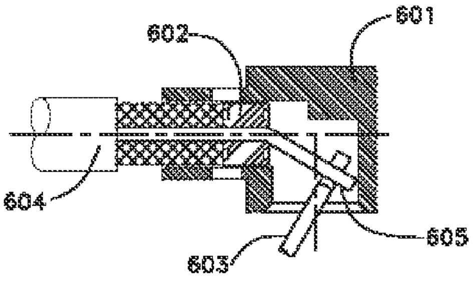
Figure 6F:
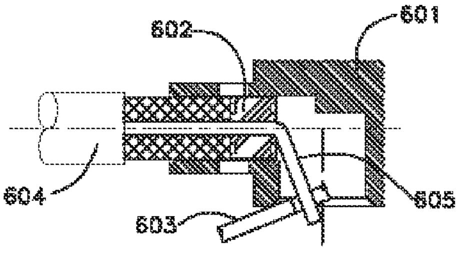
Figure 6G:
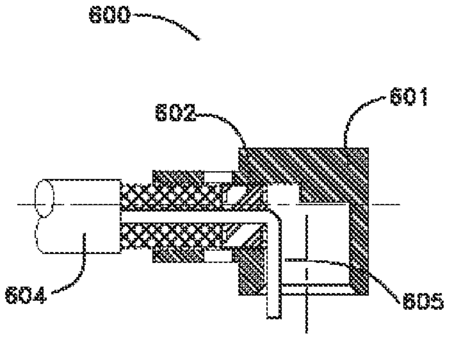
Figure 6H:
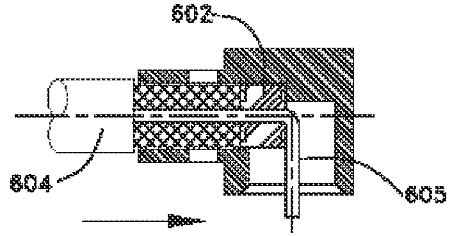
Figure 6I:
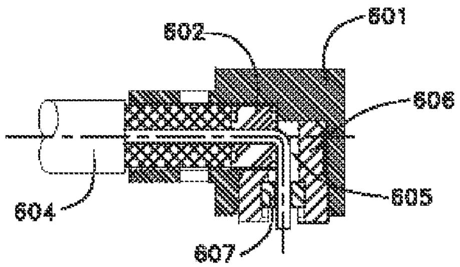

FIG. 6B shows cable 604 being pushed further into metallic housing 601 until cable center conductor 605 bottoms in housing 601. FIG. 6C shows cable 604 being pushed into metallic housing 601 while alignment tool 603 pulls cable center conductor 605 downward, bending at the intersection of dielectric stop 602. Dielectric stop 602 is thus used as an edge. FIG. 6D shows cable center conductor 605 continually being bent as cable 604 is inserted forward into metallic housing 601. FIG. 6E shows alignment tool 603 being re-positioned to the tip of cable center conductor 605. FIG. 6F shows cable center conductor 605 being bent to a final position. FIG. 6G shows the final position of cable center conductor 605, i.e., a right-angle bend of cable center conductor 605 using dielectric stop 602 as an edge. FIG. 6H shows the final position of the cable 604 and dielectric stop 602 bottomed in housing 601. FIG. 6I shows a metallic bushing 606 and dielectric 607 pressed into metallic housing 601. Dielectric 607 is an alignment dielectric pressed into the metallic bushing 606 to maintain the position of cable center conductor 605 in a 90° angle.

Figure 7A:
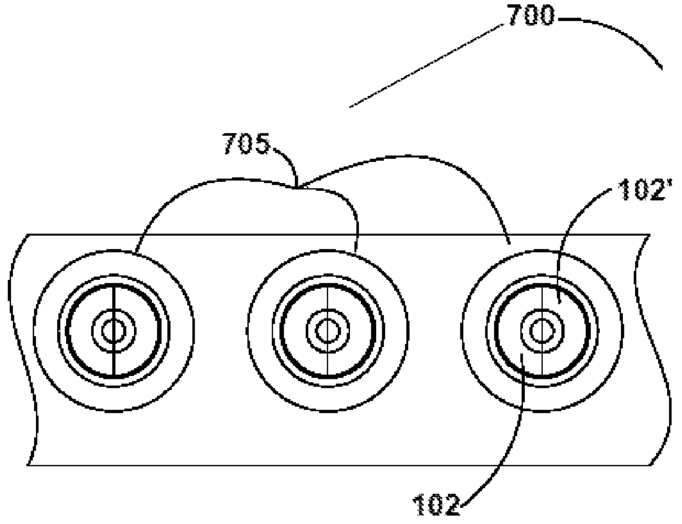
FIG. 7A is a front view of another embodiment of a connector assembly used in accordance with some embodiments.

FIG. 7A shows a front view of another embodiment of a connector assembly 700 used in accordance with some embodiments. Connector assembly 700 includes a metallic housing with multiple ports 705, each of which includes dielectric halves 102 and 102' that are configured to guide a cable into a desired position.

Figure 7B:
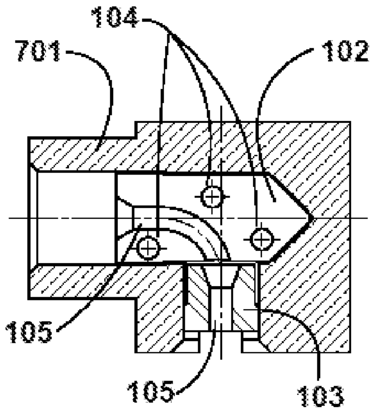
FIG. 7B is a sectional view of the connector assembly of FIG. 7A in accordance with some embodiments.

FIG. 7B shows a sectional view of connector assembly 700 in accordance with some embodiments. Metallic housing 701 may be a right angle metallic housing that is configured to house dielectrics halves 102 and 102' and an alignment dielectric 103, all of which are used to guide a cable into position. Metallic housing 701 may also include one or more alignment members 104 that are configured to orient the dielectrics 102, 102' and 103, when inserted into the housing 701. Metallic housing 701 also includes a path 105 for the cable center conductor to follow during insertion.

Figure 8A:
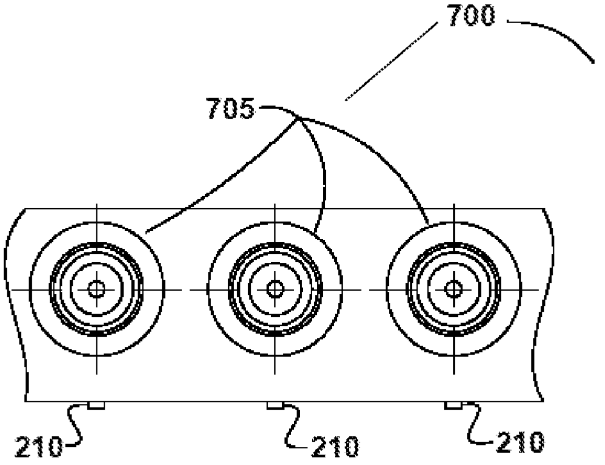
FIG. 8A is another front view of the connector assembly of FIG. 7A in accordance with some embodiments.

FIG. 8A shows another front view of connector assembly 700 in accordance with some embodiments. FIG. 8A shows that cable center conductor 210 is inserted into and protruding from the housing.

Figure 8B:
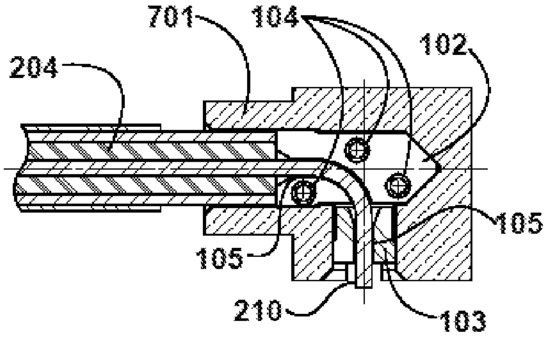
FIG. 8B is a sectional view of the connector assembly of FIG. 8A in accordance with some embodiments.

FIG. 8B shows a sectional view of connector assembly 700 of FIG. 8A in accordance with some embodiments. FIG.

8B shows the path 105 cable center conductor 210 will follow as cable 204 is inserted into housing 701.

Figure 8C:
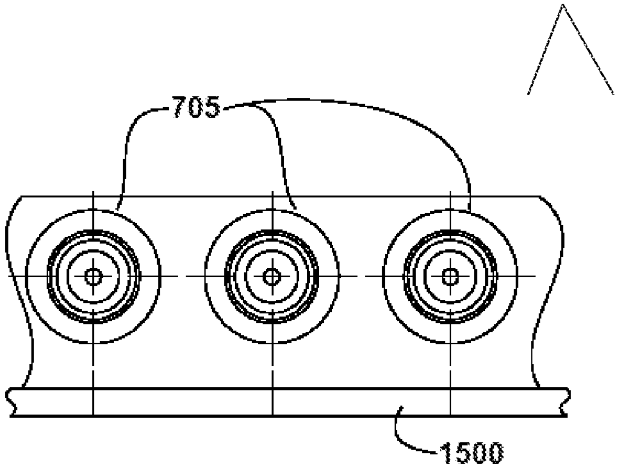
FIG. 8C is another front view of the connector assembly of FIG. 7A in accordance with some embodiments.

FIG. 8C shows another front view of connector assembly 700 in accordance with some embodiments. In FIG. 8C, cable 204 is mounted to a PCB 1500.

Figure 8D:
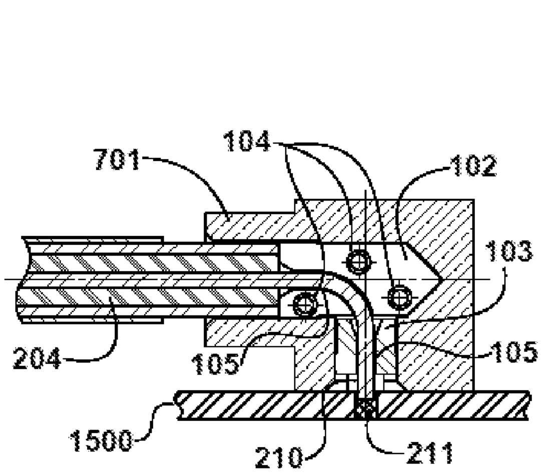
FIG. 8D is a sectional view of the connector assembly of FIG. 8C in accordance with some embodiments.

FIG. 8D shows a sectional view of connector assembly 700 of FIG. 8C in accordance with some embodiments. Connection member 211, for example, solder may be used to connect cable center conductor 210 to PCB 1500.

Figure 9A:
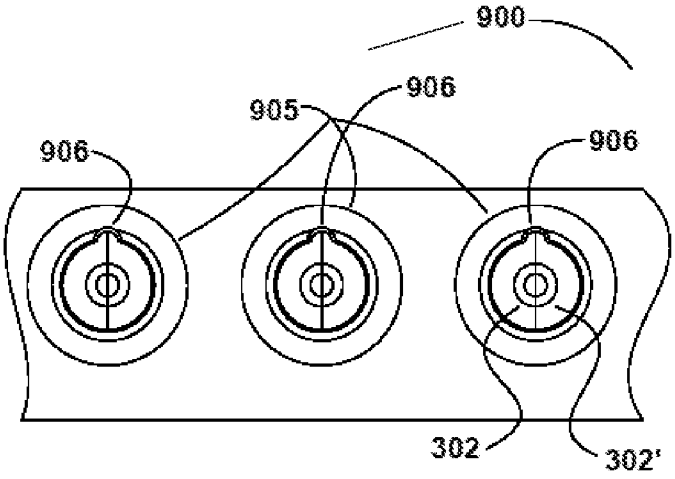
FIG. 9A is a front view of another connector assembly in accordance with some embodiments.

FIG. 9A shows a front view of another connector assembly in accordance with some embodiments. Connector assembly 900 includes a housing with multiple ports 905, each of which includes halves 302 and 302' of a first dielectric and a dielectric alignment member 906. Dielectric halves 302 and 302' are configured to guide a cable center conductor through the housing to the PCB. Dielectric alignment members 906 are configured to ensure proper orientation of dielectric sections 302 and 302' in housing 901.

Figure 9B:
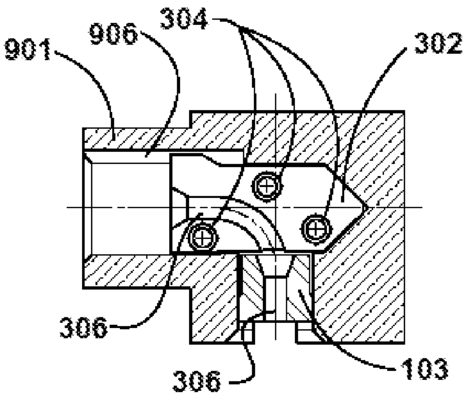
FIG. 9B is a sectional view of the connector assembly of FIG. 9A in accordance with some embodiments.

FIG. 9B shows a sectional view of connector assembly 900 in accordance with some embodiments. Housing 901 may be a right angle metallic housing that houses dielectric half 302, an alignment dielectric 103, and multiple optional alignment members 304. Dielectric section 302 is configured to guide a cable inserted into housing 901 into position. Alignment members 304 are also configured to ensure that a cable path 306 in dielectrics 302 and 302' remain in the proper orientation. In some embodiments, alignment members 304 are configured to keep dielectric sections 302 and 302' properly aligned with path 306 in the dielectric 103. Dielectric alignment member 906 also ensures that dielectric sections 302 and 302' maintain the proper orientation to path 306 on the additional dielectric 103. A center conductor of the cable follows path 306 upon insertion into housing 901.

Figure 10A:
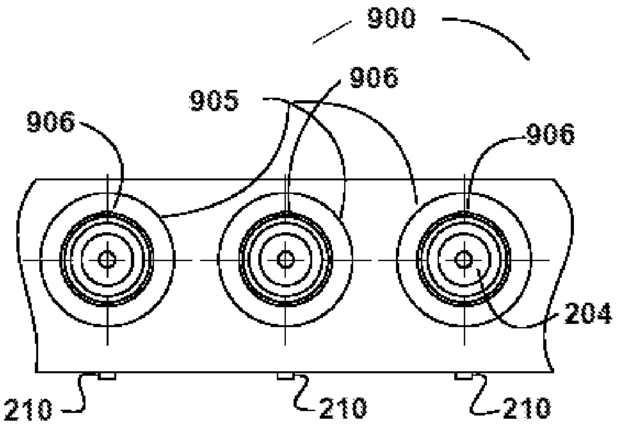
FIG. 10A is another front view of the connector assembly of FIG. 9A in accordance with some embodiments.

FIG. 10A shows another front view of connector assembly 900 in accordance with some embodiments. FIG. 10A shows that a cable 204 and a cable center conductor 210 are inserted into the housing with multiple ports 905.

Figure 10B:
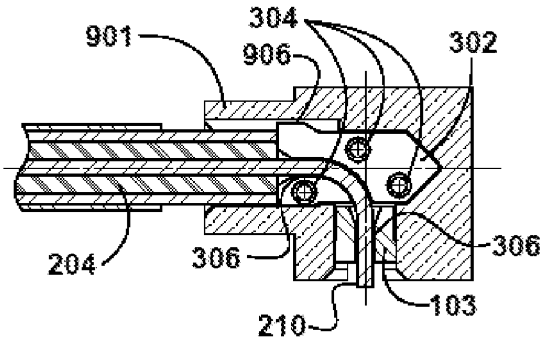
FIG. 10B is a sectional view of the connector assembly of FIG. 10A in accordance with some embodiments.

FIG. 10B shows a sectional view of connector assembly 900 of FIG. 10A in accordance with some embodiments. FIG. 10B shows the path 306 cable center conductor 210 will follow as cable 204 is inserted into housing 901.

Figure 10C:
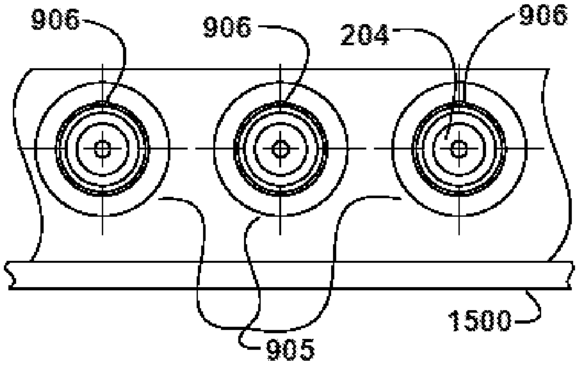
FIGS. 10C and 10D show embodiments with the cable mounted to a printed circuit board.
Figure 10D:
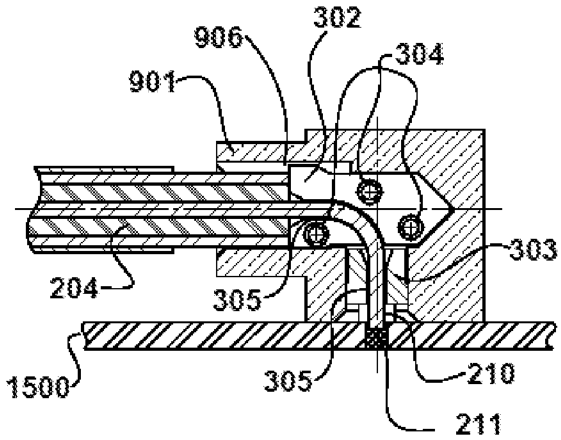

FIGS. 10C and 10D show embodiments with the cable 204 mounted to the printed circuit board 1500. A mating member 211 solders cable center conductor 210 to PCB 1500.

Due to the number of components in the connector assemblies, the connector assemblies are cost effective. The connector assemblies also have a very low a profile and may be used in compact PCB assemblies.

Figure 11:
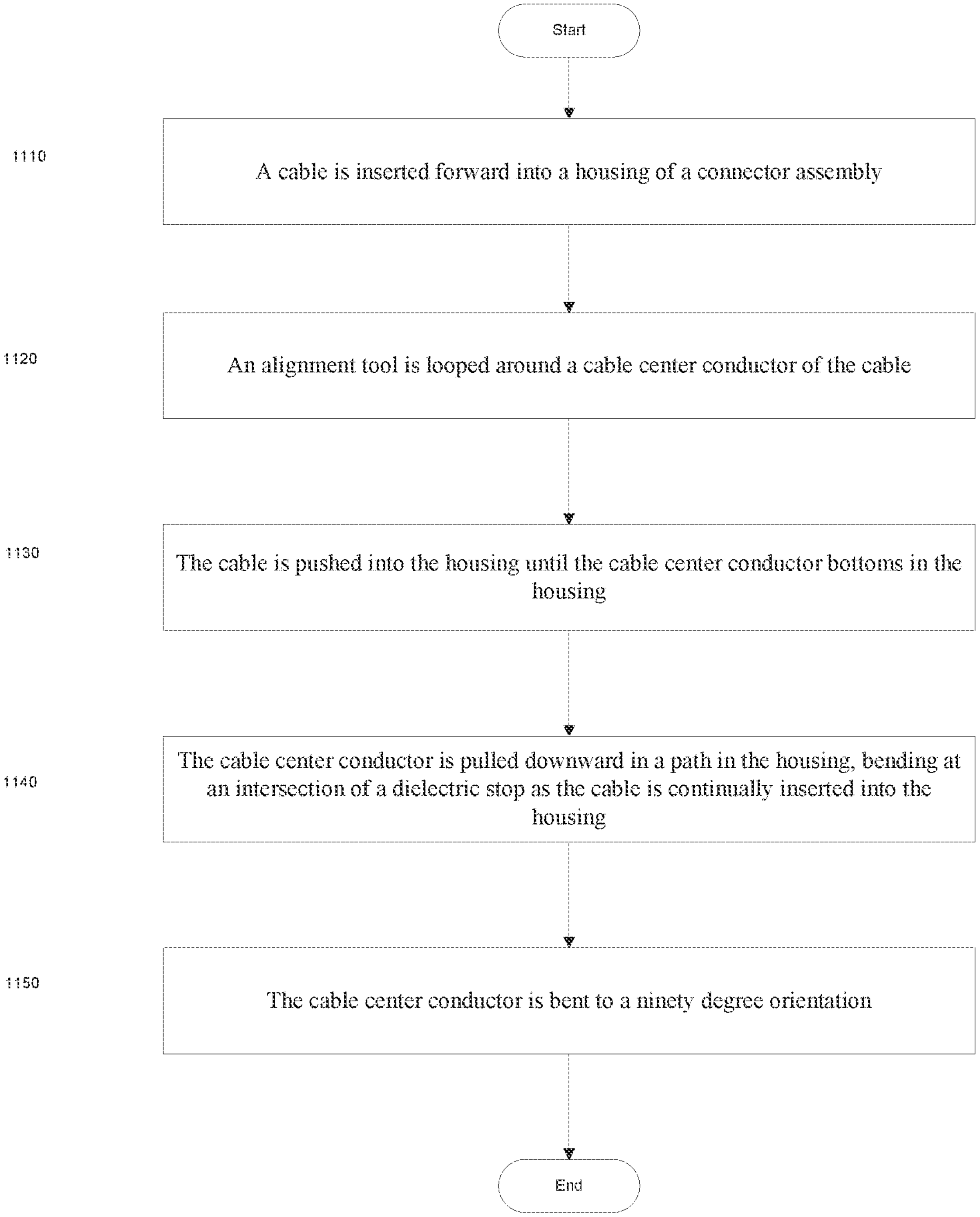
FIG. 11 is a flow diagram of a method used in accordance with some embodiments.

FIG. 11 is a flow diagram of a method used in accordance with some embodiments. At 1110, a cable is inserted forward into a housing of a connector assembly. At 1120, an alignment tool is looped around a cable center conductor of the cable. At 1130, the cable is pushed into the housing until the cable center conductor bottoms in the housing. At 1140, the cable center conductor is pulled downward in a path in the housing, bending at an intersection of a dielectric stop as the cable is continually inserted into the housing. At 1150, the cable center conductor is bent to a ninety-degree orientation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A connector assembly comprising:

a housing for storing components of the connector assembly;

a cable including a cable center conductor, wherein the cable center conductor is configured as a signal conductor; and a first dielectric and an alignment dielectric, wherein each of the first dielectric and the alignment dielectric includes a path to guide the cable center conductor through an angle to a printed circuit board, as the cable is axially inserted into the housing, wherein the connector assembly further comprises an orientation member that orients the first dielectric; and wherein the first dielectric comprises sections including the path, wherein an alignment feature in a first section of the first dielectric corresponds to an alignment feature in a second section of the first dielectric to align and retain the first and second sections.

2. The connector assembly of claim 1, further comprising at least one alignment member configured to ensure that the path in the first dielectric remain in proper orientation when the first dielectric is inserted into the housing.

3. The connector assembly of claim 1, further comprising at least one alignment member configured to maintain alignment of the first dielectric with the path in the alignment dielectric.

4. The connector assembly of claim 1, wherein the cable is configured to mount to the printed circuit board and the cable center conductor is connectable to the printed circuit board.

5. The connector assembly of claim 1, wherein the orientation member is configured to ensure orientation of the first dielectric when the first dielectric is inserted into the housing.

6. The connector assembly of claim 5, wherein the orientation member is further configured to ensure that the first dielectric maintains proper orientation to the path on the alignment dielectric.

7. The connector assembly of claim 1, further comprising a dielectric stop configured to help prevent a cable dielectric from extruding after heat is applied to solder the cable to the housing.

8. The connector assembly of claim 1, further comprising an alignment tool coupled to the cable center conductor such that the alignment tool is configured to guide the cable center conductor around a ninety-degree section of the housing.

9. A connector assembly comprising, a housing including multiple ports, wherein the housing is configured to store components of the connector assembly;

a cable including a cable center conductor, wherein the cable center conductor is configured as a signal conductor; and a first dielectric and an alignment dielectric, wherein each of the first dielectric and the alignment dielectric includes a path to guide the cable center conductor through an angle to a printed circuit board, as the cable is axially inserted into the housing, wherein the connector assembly further comprises an orientation member that orients the first dielectric; and wherein the first dielectric in each of the ports comprises sections including the path, wherein an alignment feature in a first section of the first dielectric corresponds to an alignment feature in a second section of the first dielectric to align and retain the first and second sections.

10. The connector assembly of claim 9, wherein each of the multiple ports includes the first dielectric.

11. The connector assembly of claim 9, further comprising at least one alignment member configured to ensure that the path in the first dielectric in each of the ports remain in proper orientation when the first dielectric is inserted into the housing.

12. The connector assembly of claim 9, further comprising at least one alignment member configured to maintain alignment of the first dielectric in each of the ports with a path in the alignment dielectric.

13. The connector assembly of claim 9, wherein the cable is configured to mount to the printed circuit board and the cable center conductor is connectable to the printed circuit board.

14. The connector assembly of claim 9, further comprising a dielectric alignment member in each port, wherein the dielectric alignment members are configured to ensure orientation of the first dielectric when the first dielectric is inserted into the housing.

15. The connector assembly of claim 9, further comprising a dielectric stop configured to help prevent a cable dielectric from extruding after heat is applied to solder the cable to the housing.

16. The connector assembly of claim 9, further comprising an alignment tool coupled to the cable center conductor such that the alignment tool is configured to hook around the cable center conductor and guide the cable center conductor around a ninety-degree section of the housing.

17. A connector assembly comprising, a housing including multiple ports, wherein the housing is configured to store components of the connector assembly;

a cable including a cable center conductor, wherein the cable center conductor is configured as a signal conductor;

a first dielectric and an alignment dielectric, wherein each of the first dielectric and the alignment dielectric includes a path to guide the cable center conductor through an angle to a printed circuit board, as the cable is axially inserted into the housing, and at least one alignment member configured to ensure that the path in the first dielectric remain in proper orientation when the first dielectric is inserted into the housing, wherein the connector assembly further comprises an orientation member that orients the first dielectric.

18. The connector assembly of claim 17, further comprising at least one alignment member configured to maintain alignment of the first dielectric with the path in the alignment dielectric.

19. The connector assembly of claim 17, wherein the cable is configured to mount to the printed circuit board and the cable center conductor is connectable to the printed circuit board.

20. The connector assembly of claim 17, wherein the orientation member is configured to ensure orientation of the first dielectric when the first dielectric is inserted into the housing.

* * * * *